3,258,167
PNEUMATIC TUBE CONTAINER FOR NUCLEAR REACTOR RABBIT
Heinz Geist, Ispra, and Wolfgang Kranert and Horst Kutschera, Varese, Italy, assignors to European Atomic Energy Community-Euratom, Brussels, Belgium
Filed Sept. 13, 1963, Ser. No. 308,827
Claims priority, application Germany, Sept. 13, 1962, E 23,517
2 Claims. (Cl. 222—82)

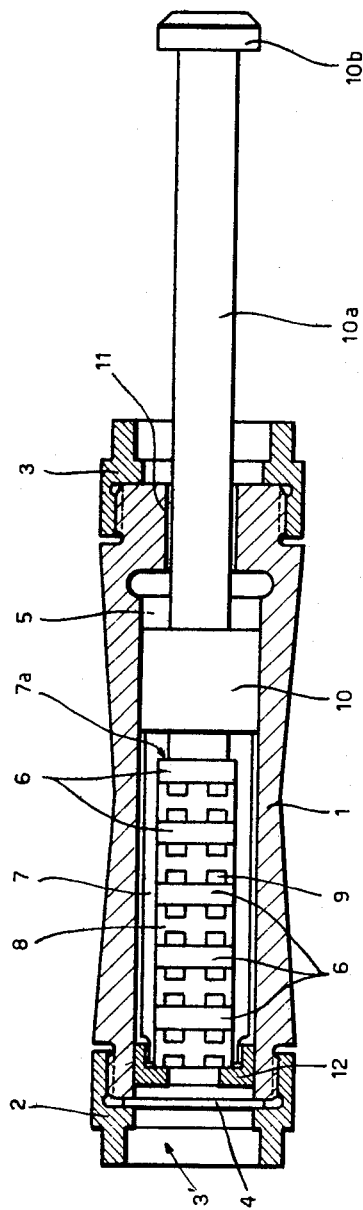

This invention relates to a pneumatic tube container with a frontal closure, in particular for "rabbits" of nuclear reactors.

It is known that rabbits are used in nuclear reactors to expose samples of materials to the radiation and neutron field of the nuclear reactor and to take them out again to a receiving station after a predetermined period of time. A special problem occurs when it is required to measure activities of a sample which are so short-lived that the time required to convey the sample out of the reactor and to the receiving station, that is the measuring station, and in particular the time required to take the sample out of its container and to prepare it for measurement, is of importance.

The conveyance time is essentially determined by the speed of the pneumatic tube container (rabbit) and is considered herein as being fixed. The unloading and making accessible of the sample at the measuring station is a mechanical problem which is primarily connected with the closure of the container, and it is with this problem that the invention is concerned.

In one known rabbit for the conveyance of liquid radiation samples the closure consists of a sealing membrane. Unloading of the container at the point of arrival is effected by the rabbit striking a spike with its membrane when it reaches the measuring station, whereby the membrane is destroyed, the rabbit is opened and the liquid is caused to flow out. The striking direction of the spike and the pressure of the membrane on the liquid is, however, opposed to the direction of movement impressed upon the liquid. This means that when the membrane strikes, the liquid is prevented from flowing out immediately and unacceptable delay occurs in the beginning of the measurement.

This drawback is avoided from the outset in the pneumatic tube container according to the present invention. The solution of the problem lies in accordance with the invention in providing a weighted element freely mounted in the container behind the material to be conveyed, this element effecting at least indirectly the opening of the closure and at the same time the expulsion of the material, when the container strikes against abutment members at the point of arrival. Thus no spike is provided at the point of arrival, but instead the closure zone is kept free for the outflow of the liquid, the container is engaged at the margin of the closure by the abutment member, for example an annular flange, and the inert mass of the weighted element acts instantaneously with all its kinetic energy in the direction of movement on the closure and on the material.

If the rabbit is a container with a sealing membrane provided as a frontal closure and the radiation material consists of a liquid, the weighted element is preferably formed as a piston, in particular as a piston-ram assembly and it is mechanically connected to a punch freely mounted in the container ahead of the material and having the purpose of breaking through the membrane. According to a further feature of the invention the construction is such that at the moment of expulsion of the irradiated material there is produced separation of the solid components from the liquid, which may be desirable in some cases.

A construction embodying these features is shown by way of example in the accompanying drawing in which the single figure is a schematical longitudinal section.

In the drawing numeral 1 indicates the cylindrical sample carrier provided with plastic, easily deformable braking caps 2, 3 with which the carrier strikes against corresponding abutments at the irradiation and measuring stations respectively; 3' is the expulsion opening of the carrier and 4 is a metallic plate acting as membrane.

In the cylindrical interior 5 of the sample carrier there is forwardly provided the material to be conveyed, namely tablets 6 of fissionable material (the solid components) spacedly mounted in a cage 7, 8, and the liquid irradiation material, that is organic liquid 9 which fills up the cylinder volume up to the membrane 4. Behind the material there is freely mounted in accordance with the invention the weighted element 10 which, upon striking of the container braking cap 2 against abutments (not shown) of the rabbit device, indirectly effects opening of the closure and simultaneously expulsion of the material. In the present embodiment the weighted element is formed as a piston, in particular as a piston-ram assembly including a ram 10a which passes through an opening 11 in the rear wall of the container. The head 10b at the end of the ram provides a limiting abutment for the ram in its terminal position upon expulsion of the material.

As mentioned above the piston acts indirectly on the closure. In detail, this occurs through the intermediary of the cage 7 and the punch ring 12 which is mounted ahead of it and ahead of the material. The cage, which is secured to the forward face of the piston and performs the abovementioned separation effect, consists of four rods 7 longitudinally disposed at the corners of a square, to the forward end of which is attached the punch 12. The rods define the stacking space for the tablets of fissionable material, the rearmost of which lies against the shoulders 7a of the rods. The tablets are spaced from each other and from the punch ring by double-crown-shaped spacer rings 8 so as to provide filling spaces for the liquid. The longitudinal dimensions of the piston and of the cage parts are reduced with respect to the available cylinder space to make room for thermal expansion of the liquid.

It will be noted that the mass of the weighted element is distributed on the piston and on the ram, that is on mechanically connected parts inside and outside the container. This is not absolutely necessary.

The operation of the novel unloading mechanism for the pneumatic tube container upon impact thereof at the point of arrival consists essentially of the following stages: punching of the sealing membrane, expulsion of the cage from the container, and automatic separation of the irradiated liquid from the tablets of fissionable material in a measuring vessel.

The invention is not limited to the embodiment illustrated in the drawing, comprising a membrane closure and a cage. Instead of the membrane, a closure lid may be provided, for example, which is opened by the accelerating piston through the intermediary of a lever or a rack and pinion. For another application it is also possible to provide, instead of a lid, a normal face cover which is connected to the piston by rigid rods and forms therewith a kind of drawer.

Finally it is also possible to place in the container, instead of a liquid, a powder or gas or even a solid object, which is rapidly unloaded in the described manner.

We claim:
1. A pneumatic tube container especially for use as a sample carrier for rabbits of nuclear reactors, comprising a frontal closure and a piston freely mounted in said container behind the material within said container, said piston being adapted to open said closure and simultaneously expel said material upon impact of the container against an abutment at its point of arrival, the piston being mechanically connected to a punch freely mounted in said container ahead of said material for opening said closure.

2. A container according to claim 1, wherein a cage is mounted between said piston and said punch, said cage having means for spacedly mounting therein determined components of said material.

References Cited by the Examiner

UNITED STATES PATENTS

| | | | |
|---|---|---|---|
| 1,269,438 | 6/1918 | Hieatzman | 222—326 |
| 1,575,972 | 3/1926 | Cochran | 222—31 |
| 2,601,852 | 7/1952 | Wendt | 128—264 |
| 2,739,593 | 3/1956 | McLaughlin | 128—263 |
| 2,934,285 | 4/1960 | Niehaus | 243—34 |

FOREIGN PATENTS 252,587    6/1926    Great Britain.

RAPHAEL M. LUPO, *Primary Examiner.*

LOUIS J. DEMBO, *Examiner.*

S. TOLLBERG, *Assistant Examiner.*